(12) United States Patent
Nakai et al.

(10) Patent No.: US 7,916,344 B2
(45) Date of Patent: Mar. 29, 2011

(54) IMAGE DETECTING METHOD

(75) Inventors: Yoshiyuki Nakai, Nara (JP); Koichi Sumida, Nara (JP); Yohichi Shimazawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1091 days.

(21) Appl. No.: 11/644,635

(22) Filed: Dec. 21, 2006

(65) Prior Publication Data
US 2007/0159649 A1 Jul. 12, 2007

(30) Foreign Application Priority Data

Jan. 6, 2006 (JP) ................. 2006-001565

(51) Int. Cl.
*H04N 1/46* (2006.01)
*G06K 19/06* (2006.01)
*G06K 9/00* (2006.01)
*G06K 9/18* (2006.01)
*G06K 9/36* (2006.01)

(52) U.S. Cl. ......... 358/1.9; 358/537; 358/538; 358/539; 235/494; 382/165; 382/182; 382/187; 382/188; 382/189; 382/291

(58) Field of Classification Search .................. None
See application file for complete search history.

(56) References Cited

U.S. PATENT DOCUMENTS

| | | | | |
|---|---|---|---|---|
| 3,978,317 A | * | 8/1976 | Yamaguchi et al. | 235/462.38 |
| 5,471,550 A | * | 11/1995 | Kurachi | 382/200 |
| 5,860,679 A | * | 1/1999 | Fukuda et al. | 283/70 |
| 6,298,150 B1 | | 10/2001 | Sonoda et al. | |
| 6,370,271 B2 | | 4/2002 | Fu et al. | |
| 6,478,232 B1 | * | 11/2002 | Dowling | 235/494 |
| 6,888,962 B1 | | 5/2005 | Sonoda et al. | |
| 2004/0052401 A1 | | 3/2004 | Suzaki | |
| 2006/0215879 A1 | * | 9/2006 | Whitaker | 382/103 |

FOREIGN PATENT DOCUMENTS

| | | |
|---|---|---|
| JP | 08-115021 | 5/1996 |
| JP | 9-016043 | 1/1997 |
| JP | 11-126259 | 5/1999 |
| JP | 2000-307857 | 11/2000 |
| JP | 2000-333005 | 11/2000 |

* cited by examiner

*Primary Examiner* — Mark K Zimmerman
*Assistant Examiner* — Haris Sabah
(74) *Attorney, Agent, or Firm* — David G. Conlin; Steve M. Jensen; Edwards Angell Palmer & Dodge LLP

(57) ABSTRACT

An image detecting method is provided that permits the specific image information to be present within image data of a document and is capable of detecting the specific image information within a relatively short period of time and accurately, with little effect of interference with the image data of the document and without regard to an angle at which the document is placed. The specific pattern image comprises a plurality of dot images Sa and Sb arranged in a straight line, and by positioning one of the plurality of dot images Sa and Sb at the center O of a plurality of concentric circles of different diameters and detecting that other dot images are on the plurality of concentric circles $R_1$ to $R_4$ and are on a straight line L running through the center O of the concentric circles, the pattern image is detected.

6 Claims, 9 Drawing Sheets

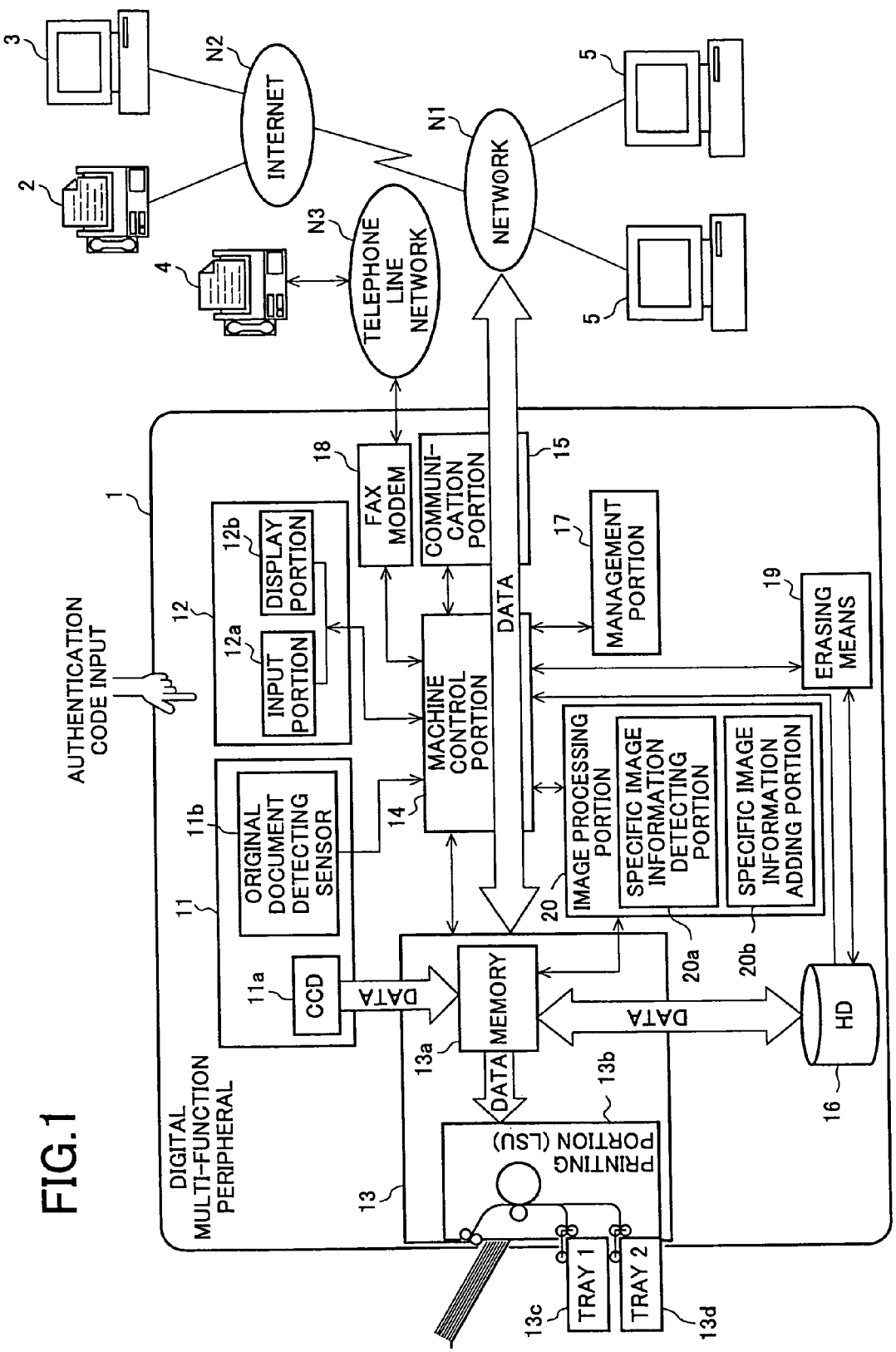

FIG. 2A
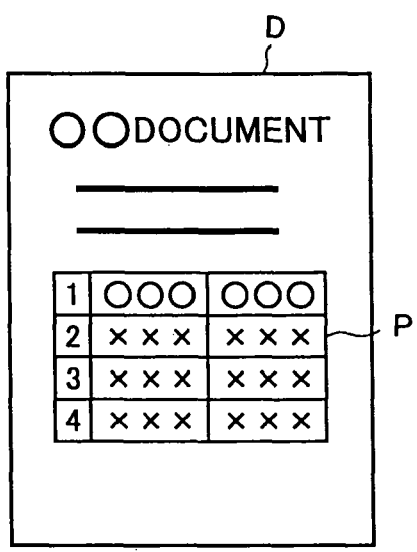
+
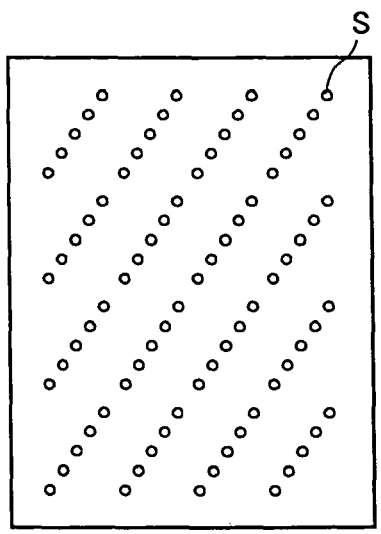
FIG. 2B
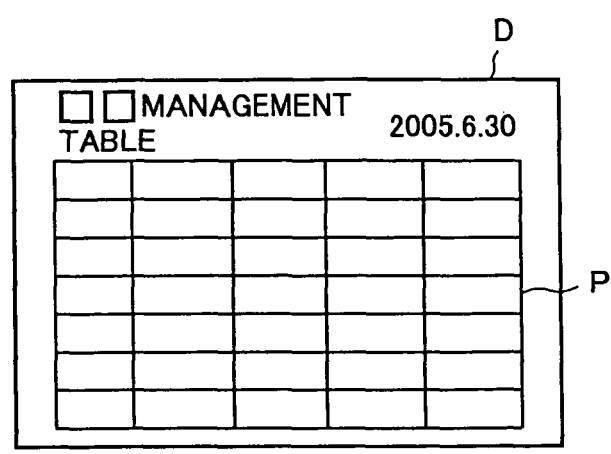
+
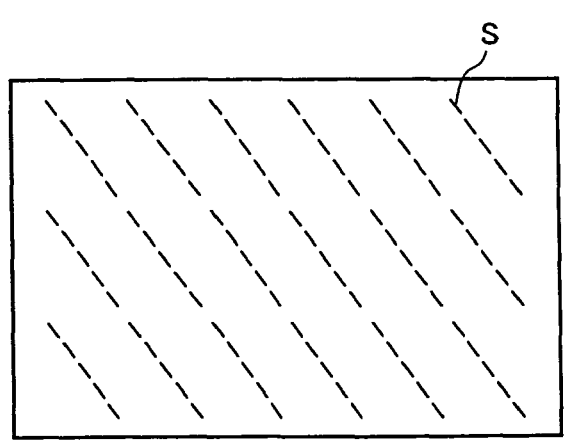

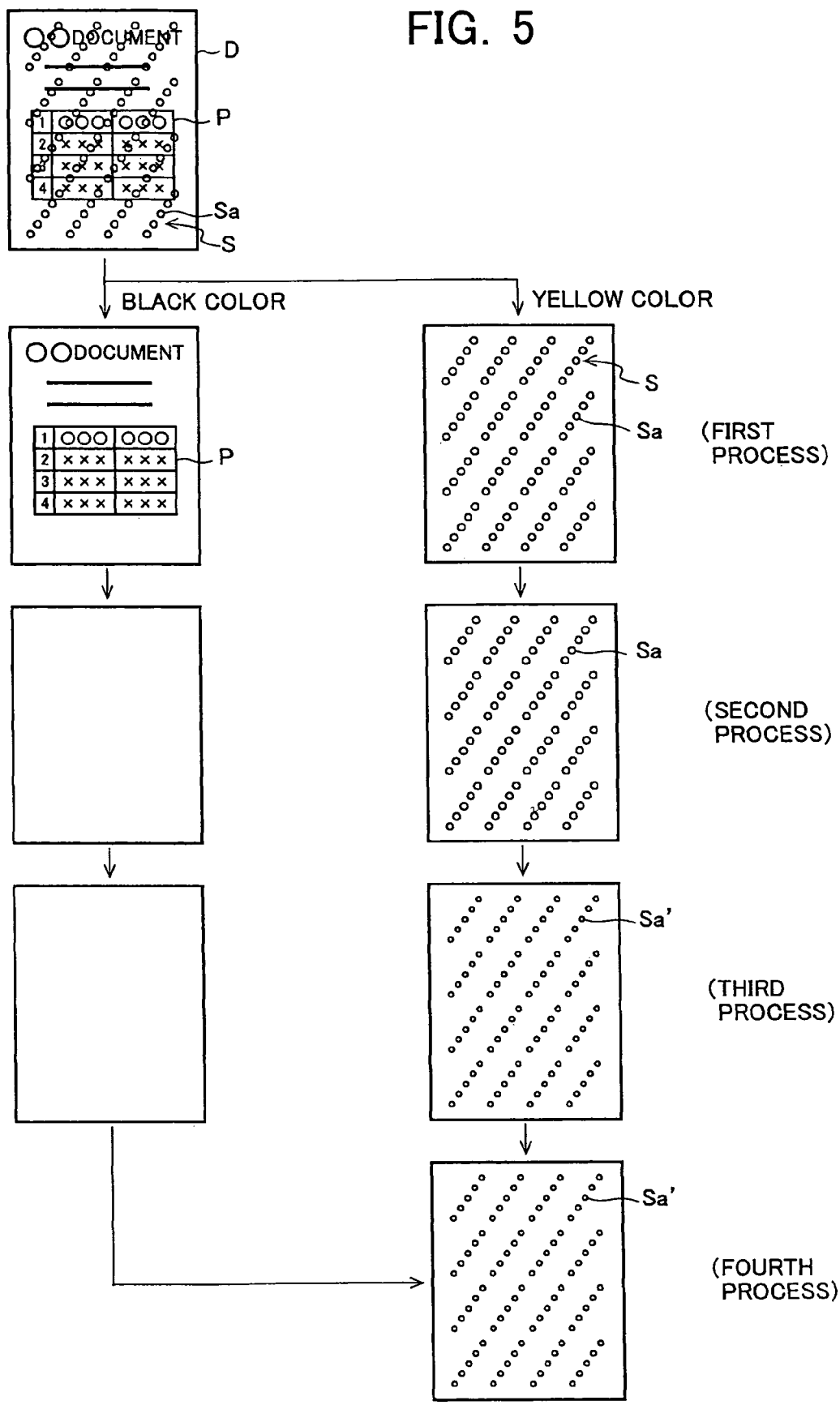

IMAGE DETECTING METHOD

CROSS-NOTING PARAGRAPH

This Nonprovisional application claims priority under 35 U.S.C. §119(a) on patent application No. 2006-001565 filed in JAPAN on Jan. 6, 2006, the entire contents of which are hereby incorporated herein by references.

FIELD OF THE INVENTION

The present invention relates to an image detecting method of detecting a specified pattern image added to image data of a document.

BACKGROUND OF THE INVENTION

To prevent unauthorized copying of a document composed of image data, an image of a specific pattern (hereinafter, specific image information) such as a woven pattern is added to or combined with the document. This specific image information is also referred to as copy prohibiting information or copy preventing information. Among the method of adding the specific image information are, for example, a method of sneaking the information into a frequency domain such as digital watermarking, a method of adding a bar code, etc., to a non-image area, a method of adding the information such as a watermark to an image area.

The specific image information described above is, in some case, attached to the document in such a state as to be indiscernible to a user and in other case, attached to the document in such a state as to be sufficiently discernible to the user as the specific image information to restrain copying. However, irrespective of whether the specific image information is discernible to the user or not, when the user attempts to copy the document with the specific image information added thereto using a copying machine, etc., the machine performs an operation such as prohibiting the document from being copied or printed or outputting information of "copy prohibited".

While various types of specific image information are proposed, for example, Japanese Laid-Open Patent Publication No. 2000-307857 discloses printing of a candidate image of a specific pattern in a checkered manner on the back side of a document without impairing readability of the document. It also discloses judging of whether the detected candidate image of the specific pattern is the specific image information, by examining positional arrangement of the candidate image of the specific pattern and prohibiting an operation of copying, etc., in the case of the specific image information. Japanese Laid-Open Patent Publication No. H09-16043 discloses the technology of providing the specific image information divided into a plurality of colors and, at the time of detection, combining extracted results of the plurality of colors into one and accurately detecting the specific image information based on such results.

However, if the specific image information is provided on the back side of an original document, to avoid interference of the specific image information with the image data of the document, as in the Japanese Laid-Open Patent Publication No. 2000-307857, then there is a problem that the document is limited to one of thin paper quality for detecting the specific image information only from one side of the document, that it takes time to detect from both sides of the document, and that the technology is not applicable to the document having the image data on both sides thereof.

If the specific image information is permitted to be present in the document as in the Japanese Laid-Open Patent Publication No. H09-16043, then there will be many cases of erroneously recognizing the image data as the specific image information depending on the image data of the document. For example, when the image data of the original document has the image data similar to that of the specific image information or interferes with the specific image information, the discernibleness could decrease. Furthermore, even if the specific image information is divided into a plurality of colors, interference is caused depending on the original document and detecting accuracy does not necessarily improve depending on the angle at which the document is placed at the time of detection.

SUMMARY OF THE INVENTION

The present invention has an object of providing an image detecting method of permitting the specific image information to be present within image data of a document and capable of detecting the specific image information within a relatively short period of time and accurately, with little effect of interference with the image data of the document and without regard to an angle at which the document is placed.

An image detecting method of the present invention is a method of detecting specific pattern image added to image data of a document, wherein the specific pattern image comprises a plurality of dot images arranged on a straight line, wherein one of the plurality of dot images is positioned at the center of a plurality of concentric circles of different diameters, and wherein by detecting that other dot images are on the plurality of concentric circles and are on a straight line running through the center of the concentric circles, the pattern image is detected.

In detecting whether the dot images are on the concentric circles, the range of detection in the direction of diameter of the concentric circles is extended depending on the angle at which the pattern image is arranged. The range of detection in the direction of diameter of the concentric circles is minimized when the angle at which the pattern image is arranged is horizontal (0°) and vertical (90°) and is maximized when the angle at which the pattern image is arranged is in the middle (45°). In detecting whether the dot images are on the straight line running through the center of the concentric circles, the range of detection in the circumferential direction of the concentric circles is extended to 3° (±1.5°). When the plurality of dot images arranged in a straight line are of a circular or rectangular dot shape, the center of one of the dot images is positioned at the center of the concentric circles, whereas when they are of a short linear shape, one end of one of the dot images is positioned at the center of the concentric circles.

BRIEF DESCRIPTION OF THE DRAWINGS

FIG. 1 is a block diagram of an example of a digital multi-function peripheral to which an image detecting method of the present invention is applied.

FIG. 2A and FIG. 2B are diagrams of an example of specific image information (for example, copy prohibiting information) to be added to image data of a document.

FIG. 5 is a diagram of a process of image processing of extracting a dot image of the specific image information from an input document by the detecting portion of FIG. 4.

PREFERRED EMBODIMENTS OF THE INVENTION

Figure 3:
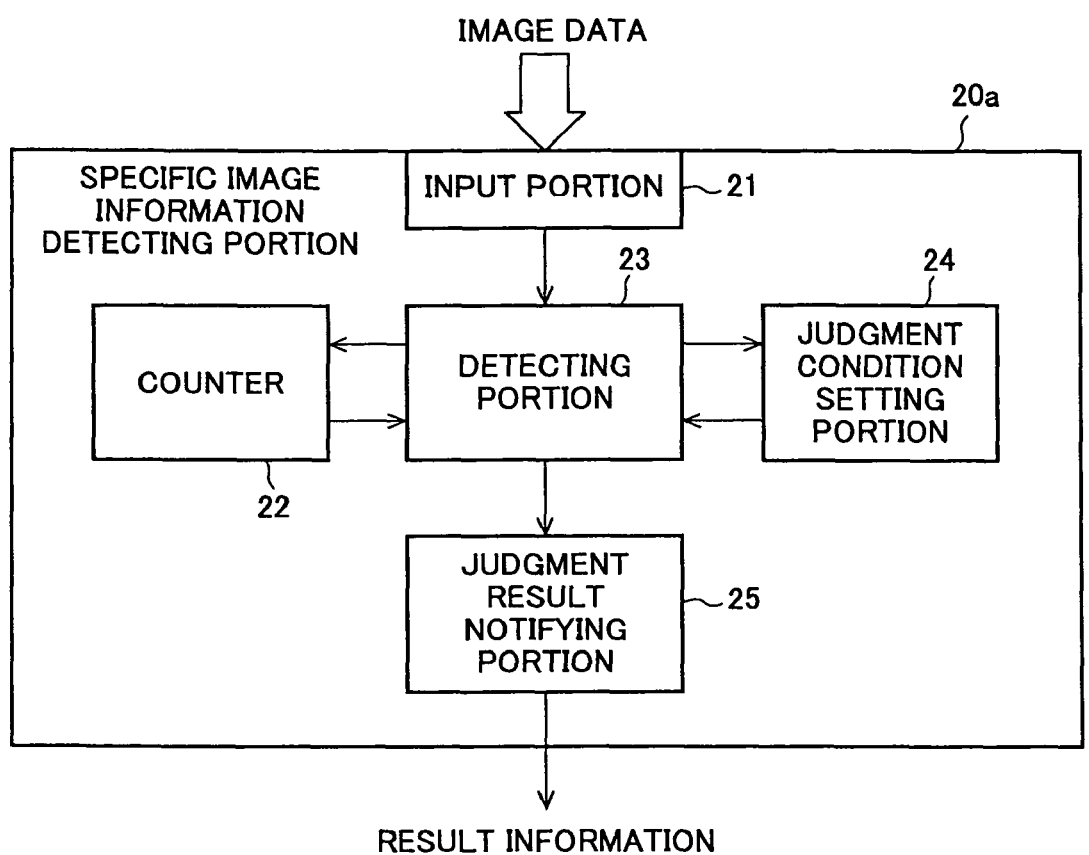
FIG. 3 is a block diagram of an example of a specific image information detecting portion.

Description will be made of an embodiment of the present invention, with reference to drawings. FIG. 1 is a block diagram of an example of a digital multi-function peripheral 1 to which an image detecting method of the present invention is applied. This digital multi-function peripheral 1 is configured as a multi-functional machine equipped with functions of a copying machine, a printing device, a facsimile device, a scanning device, etc. The digital multi-function peripheral 1 is connected to a plurality of personal computers (PC) 5 by way of a communication network N1 such as an in-house LAN and is configured to be capable of exchanging information with PC 5. The digital multi-function peripheral 1 is further connected to a wide-area communication network N2 such as Internet to transmit and receive information to and from external devices 2 and 3 and is also configured to be capable of communicating with other facsimile device 4 through a telephone line network N3.

The digital multi-function peripheral 1 is equipped with a machine control portion 14 composed of a CPU for arithmetic processing, a RAM for temporary storage of processing information, a ROM for storage of a control program, etc. This machine control portion 14 connects with a management portion 17 that manages the processing performed by the digital multi-function peripheral 1 and keeps management information (various control information) for such management and an image reading portion 11 that generates image data by reading an image recorded on a document, etc. The image reading portion 11 has a CCD 11a for capturing the image data of the document and an original document detecting sensor 11b for detecting presence or absence of the document.

The machine control portion 14 connects with an image forming portion 13 that forms the image data on recording paper. The image forming portion 13 is provided with a memory 13a for temporary storage of read image data, a printing portion (LSU) 13b that reads out the image from the image data stored in the memory 13a and prints the image on the recording paper, and trays 13c and 13d for feeding the recording paper to the printing portion 13b. In this case, the digital multi-function peripheral 1 serves as a copying machine that, after storing the image data generated at the image reading portion 11 in the memory 13a, forms the image at the printing portion 13b.

A FAX modem 18 is connected to the machine control portion 14 to transmit and receive to and from a facsimile device 4 by way of the telephone line network N3 and furthermore, a communication portion 15 is connected thereto to exchange information with PC 5 or external devices 2 and 3 by way of the communication networks N1 and N2. In this case, the digital multi-function peripheral 1 also serves as a facsimile device or a printing device of PC 5, etc.

An operation portion 12 for inputting by a user is connected to the machine control portion 14. The operation portion 12 has an input portion 12a such as a touch panel or a ten-key pad for inputting information such as a control command and a display portion 12b such as a liquid crystal display for displaying information for operation. An authentication code, etc., for authenticating a manager or user of the digital multi-function peripheral 1 is also input at this operation portion 12. The authentication code is, in some cases, input from the outside by way of the FAX modem 18 or the communication portion 15.

Furthermore, a hard disk (HD) 16 is connected to the machine control portion 14. The HD 16 keeps in memory the data related to image processing such as the image data generated by the image reading portion 11. The DH 16 is also connected to an erasing means 19 that is connected to the machine control portion 14, and the erasing means 19 erases the data retained in memory at the HD 16, as required. The machine control portion 14 connects with an image processing portion 20 equipped with a specific image information detecting portion 20a of detecting the specific image information, to be described later, and a specific image information adding portion 20b of adding the specific image information.

The specific image information to be added to the image data is stored and retained beforehand in the specific image information adding portion 20b (or stored and retained in other accessible memory) and, by the control of the machine control portion 14, is temporarily memorized in the memory 13a in such a state that the specific image information is added to the image data. The image data retained in the memory 13a together with the specific image information is treated as a document provided with the specific image information (for example, copy prohibiting information), when printed on the recording paper at the printing portion 13b. In this case, the specific image information may be added in yellow (color machine) or gray (monochrome machine) in such a manner as not to be easily visible to the naked eye. Also when image forming is made at the printing portion 13b based on the image data read by way of the FAX modem 18 or the communication portion 15, the specific image information can be added by the specific image information adding portion 20b.

On the other hand, the image processing portion 20 has the specific image information detecting portion 20a of detecting whether the specific image information is contained in the image data read by the image reading portion 11. The specific image information detecting portion 20a is a portion to realize the method of detecting the image of the specific image information according to the present invention and if the specific image information is contained in the image data, then the machine control portion 14 controls so that copying of the image data is prohibited (image forming at the image forming portion 13 is disabled).

However, for example, some documents have an image of unclear complicated characters and some documents have a noise image as if dusts were attached thereto, and only the specific image information must be detected out of such images. The present invention is detecting the specific image information in a short time and efficiently in the specific image information detecting portion 20a to disable image forming as described above, even if the document is a unclear document containing noises and additionally even if the specific image information is added in such a manner as not to be easily visible to the naked eye, though details thereof will be described later.

FIG. 2A and FIG. 2B are diagrams of an example of the specific image information (for example, copy prohibiting information) to be added to the image data of the document.

FIG. 2A shows an example of the specific image information formed by a plurality of circular dot images and FIG. 2B shows an example of specific image information formed by a plurality of short linear dot images. It is desirable that the specific image information S be formed not to overlap the image data P (for example, a table made of ruled lines) of the original document D and be formed by a simple and easy-to-detect pattern.

In the present invention, the specific image information S is shown by a pattern of a plurality of circular dot images Sa, a plurality of short linear dot images Sb (these dot images Sa and Sb being hereinafter referred to as "dot images"), etc., arranged on straight lines with a predetermined interval and inclined by an angle of, for example, 45°, as opposed to rule-line image data P. The dot images arranged in a predetermined direction and with a predetermined interval may assume various shapes such as ellipse, rectangular, triangle, etc.

Such specific image information S is provided, by the specific image information adding portion 20b as described in FIG. 1, to an original input document D from which a copy is made. In the present invention, detailed description of a method of adding the specific image information S is omitted. The specific image information S is so formed as to be visible to clearly indicate a copy-prohibited document to the image data P or so formed as not to be easily visible at a glance. The present invention presents a method of easily detecting the specific image information S in both case, and description will then be made of the method of detecting the specific image information S.

FIG. 3 is a block diagram of a schematic of the specific image information detecting portion 20a as described in FIG. 1. The specific image information detecting portion 20a comprises an input portion 21 to which read specific image information is input together with the image data and a detecting portion 23 that detects the specific image information out of input data. The specific image information detecting portion 20a further comprises a counter 22 that counts the number of times of detection of the specific image information detected at the detecting portion 23 and a judgment condition setting portion 24 for judging the specific image information at the detecting portion 23. If the specific image information detected at the detecting portion 23 is judged to be, for example, the copy prohibiting information, then the results are notified to the machine control portion 14 by way of a judgment result notifying portion 25, and the control is made to prohibit the copying of the image data.

Figure 4:
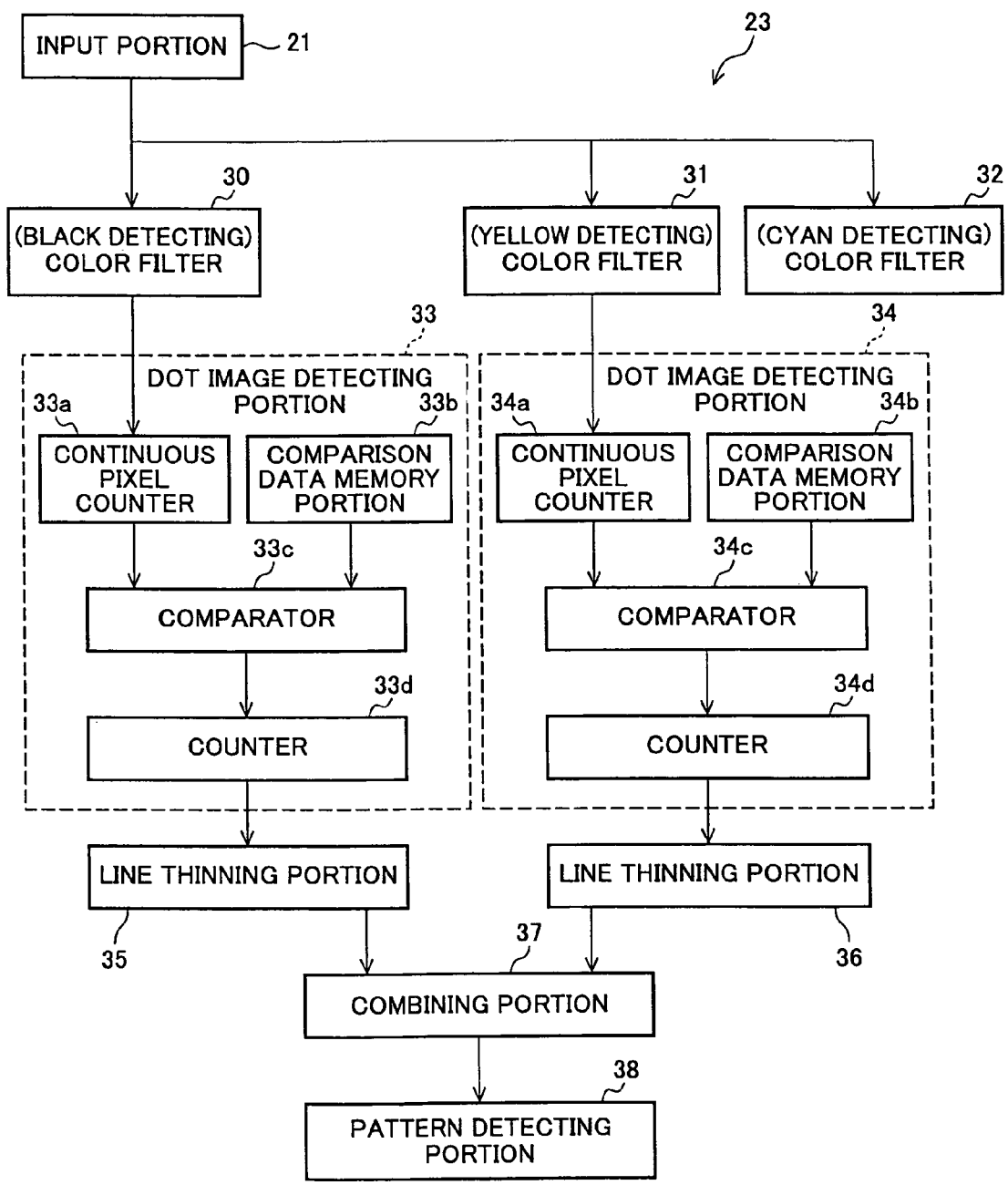
FIG. 4 is an explanatory diagram of a schematic of a detecting portion of FIG. 3.

FIG. 4 is an explanatory diagram of a schematic of the detecting portion 23 of the specific image information detecting portion 20a. The detecting portion 23 is a portion that judges whether the specific image information of copy prohibiting, etc., is present in the input image data and has color filters 30, 31 and 32 of plural colors that can be used for detection of, for example, black, yellow, and cyan colors. The color filters 30, 31 and 32 perform binarizing processing of colors of input image. For example, if the specific image information is input by means of a specific color, then the information is color-separated by color filters 30 to 32 and is extracted as binarized data. Incidentally, it is assumed that the specific image information is formed using such dot images as shown in FIG. 2A or FIG. 2B.

Input image data and specific image information are separated by the color filters 30 to 32 and the binarized data is input to dot image detecting portions 33 and 34 (the dot image detecting portion for the color filter 32 is omitted in FIG. 4). In the dot image detecting portions 33 and 34, continuous pixels of the image are counted by continuous pixel counters 33a and 34a. A count value thereof is counted in terms of both one dimension and two dimensions and is compared, by comparators 33c and 34c, with a value set in advance in comparison data memory portions 33b and 34b. As a result of comparison, data having the number of pixels less than or equal to the preset number of pixels and greater than or equal to the preset number of pixels is deleted. For example, when the comparison data memory portion 33b and 34b are so preset that the data having the number of continuous pixels of 3 pixels or less or the data having the number of continuous pixels of 7 pixels or more is to be deleted, images other than the image having the data length of the number of continuous pixels of more than or equal to 4 pixels and less than or equal to 6 pixels are deleted.

Counters 33d and 34d count the number of the images having a predetermined number of pixels (for example, dot image of 5×5 pixels) detected at the comparators 33c and 34c. When the counted number is less than a predetermined value, the counters 33d and 34d can render judgment that the document does not have the specific image information of this particular color, by deleting all data, etc. If the counted number has reached the predetermined value, then the detected dot image can be reduced to a dot image of a predetermined size at line thinning portions 35 and 36.

The data thin-lined at the line thinning portions 35 and 36, in such case where the specific image information is formed by black and yellow colors, may be so arranged that the sizes of detected dot images of black and yellow may be adjusted to each other. As a result, images of the thin-lined data can be combined into one specific image information by a combining portion 37 using an OR circuit, etc. A pattern detecting portion 38 detects what kind of specific image information is represented by thus thin-lined and combined specific image information. The pattern detection will be described later.

FIG. 5 is a diagram of a process of image processing of extracting a dot image of the specific image information from an input document by the detecting portion of FIG. 4 described above. Here, to simplify the description, it is assumed that the document input to the detecting portion 23 is such a document D as shown in FIG. 2A, that the image data P to be input is formed by a black color (including gray), and that the dot image Sa of the specific image information S is formed by a yellow color (not to be easily visible).

Upon input of the document D, at the first process, the image data P is selected by the black color detecting color filter 30 and at the same time, is binarized, and the dot images Sa making up the specific image information S is selected by the yellow color detecting color filter 31 and at the same time, is binarized. Next, at the second process, the image data P and the dot images Sa are counted by the continuous pixel counter 33a and are compared with the number of pixels set at the comparison data memory portion 33b.

The image data P shown at the left side of the diagram is deleted due to a large number of continuous pixels. On the other hand, the dot images Sa at the right side formed in advance in a predetermined size are left as image data. The dot images Sa are confirmed by the counter 34d to have the number larger than the predetermined number and advance to the third process. Images remaining undeleted at the pixel count of the image data P are entirely deleted since they do not reach the predetermined number when counted by the counter 33d.

At the third process, the dot image Sa, by the line thinning processing (for example, from 5×5 pixels to 2×2 pixels) at the line thinning portion 36, is changed to a dot image Sa' of lower resolution, enhancing the discernibleness at a pattern detection to be described later and enabling reduced memory capacity, resulting in a higher processing speed. At the fourth process, the black color image at the left side and the yellow color image at the right side are combined into one image at the combining portion 37. In the example of FIG. 5, since the black color image data does not contain the predetermined dot image, the specific image information S composed of only the yellow color dot image Sa' is extracted in practice.

Description will then be made of a method of detecting a pattern image according to the present invention, with reference to FIGS. 6A to 9. Specifically, this is a method of detecting according to what kind of pattern the dot images extracted by the image processing of FIG. 5 described above are formed. The "pattern image" as used in the present invention means the image that is the specific image information described above and is a plurality of dot images linearly arranged according to a predetermined pattern. The "dot image" means a dot-like image of circular, rectangular or short linear shape as exemplified in the description of FIG. 2A or FIG. 2B.

Figure 6A:
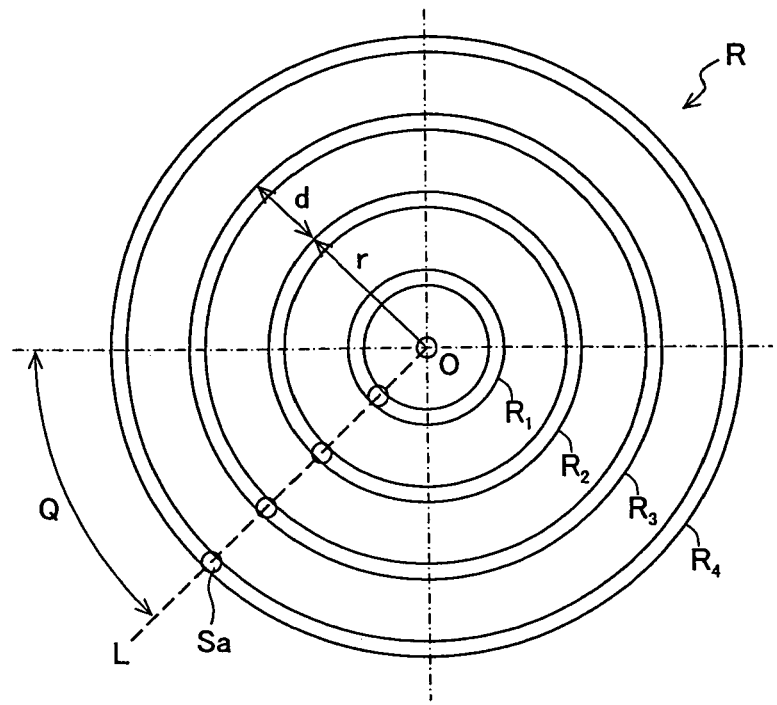
FIG. 6A and FIG. 6B are explanatory diagrams of a pattern image detecting method according to the present invention.
Figure 6B:
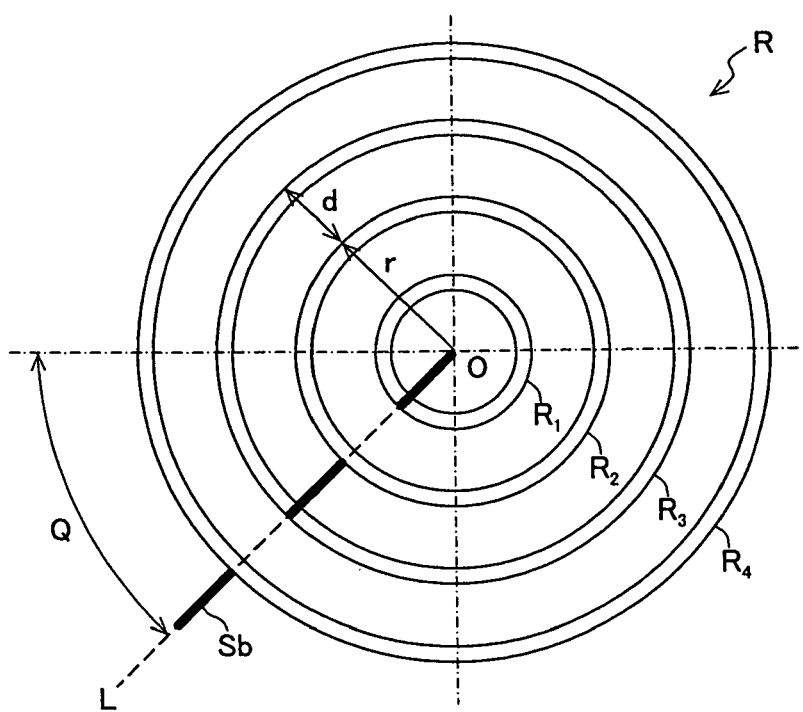

FIG. 6A is a diagram of an example of the pattern image formed by a plurality of dot images Sa of circular shape and FIG. 6B is a diagram of an example of the pattern image formed by a plurality of dot images Sb of short linear shape. A plurality of concentric circles $R_1$, $R_2$, $R_3$, $R_4$, . . . $R_n$ (hereinafter, collectively concentric circle R) of different diameters concentrically arranged are placed over the pattern image composed of a plurality of dot images Sa or Sb. The concentric circle R is a virtually prepared circle, with predetermined radius r and distance d set in advance, and is designed to move on the pattern image.

In the present invention, after a number of dot images Sa are detected by the processing shown in FIG. 5, the concentric circle R is placed over the dot images Sa in such a manner that one of the dot images Sa is located at the center O of the concentric circle R, in the example of FIG. 6A. At this moment, the dot images Sa are detected on a plurality of concentric circles $R_1$ to $R_n$ (on the edge of concentric circles) of the concentric circle R. In this case, while there are three cases of plural dot images Sa, one dot image Sa or no dot image Sa being on the same concentric circle, all dot images Sa on the concentric circle are detected in the present invention.

If a plurality of dot images Sa are detected on whichever concentric circle or circles, then detection is made of whether the number of the dot images Sa on a straight line L running through the center O of the concentric circle is equal to or more than a predetermined number. Namely, detection is made of whether a plurality of dot images Sa are on the concentric circles $R_1$ to $R_n$ of the concentric circle R, respectively and these dot images Sa are aligned on the straight line running through the center of the concentric circle R (hereinafter, pattern detection). Furthermore, with respect to dot images Sa at different positions, the concentric circle R is likewise overlapped and the pattern detection is likewise made. As a result, with same pattern detected at a plurality of positions, the dot images Sa are determined to be the predetermined specific image information (for example, copy prohibiting information).

After a number of dot images Sb are detected by the processing shown in FIG. 5, the concentric circle R is placed over the dot images Sb in such a manner that an end of one of the dot images Sb is located at the center O of the concentric circle R, in the example of FIG. 6B. At this moment, the dot images Sb with both ends of each thereof positioned on a plurality of concentric circles $R_1$ to $R_n$ (on the edge of concentric circles) of the concentric circle R are detected. In this case, while there are three cases of plural dot images Sb, one dot image Sb or no dot image Sb being on the same concentric circle, all dot images Sb on the concentric circle are detected in the present invention.

If a plurality of dot images Sb are detected on whichever concentric circle or circles, then detection is made of whether the number of the dot images Sb on a straight line L running through the center O of the concentric circle is equal to or more than a predetermined number. Namely, detection is made of whether a plurality of dot images Sb are on the concentric circles $R_1$ to $R_n$ of the concentric circle R, respectively and these dot images Sb are aligned on a straight line. Furthermore, with respect to dot images Sb at different positions, the concentric circle R is likewise overlapped and the pattern detection is likewise made. As a result, with same pattern detected at a plurality of positions, the dot images Sb are determined to be the predetermined specific image information (for example, copy prohibiting information).

In FIG. 6A and FIG. 6B, the number of the dot images Sa or Sb aligned on a straight line can be arbitrarily set, and the distance between two dot images Sa or the length, etc., of the dot image Sb can be made to differ, depending on the position in arrangement order, to produce different patterns. In this case, necessary number of dot images Sa or Sb to be detected, the radius r and distance d of concentric circles $R_1$ to $R_n$ are also made to differ respectively. By such arrangement, the specific image information may be made to differ and, for example, ranking of importance may be made at the time of copy prohibiting information and the copy restriction may be eased by the authentication of a user.

The dot image Sa or Sb to be located at the center O of the concentric circle R may be a leading-edge or trailing-edge dot image of a pattern image or may be the dot image at the middle of an array. When the dot image at the middle of the array is positioned at the center O of the concentric circle, the dot images Sa or Sb are arranged on both sides of the center O of the concentric circle. In this case, it may be so arranged that the dot images Sa or Sb, alternately from both sides of the center O of the concentric circle, are on the concentric circles $R_1$ to $R_n$. Also, by making pattern detection at a plurality of locations and by setting that the number of times of detection thereof is to be equal to or more than a predetermined number, the possibility can be avoided that different results are produced depending on the location of detection. However, when the location at which the specific image information S is added is predetermined, judgment may be made by one time detection.

It is desirable that the straight line L that runs through the center O of the concentric circle R and on which the dot images Sa or Sb are arranged be so set as not to overlap the image data P of the document D. For this reason, it is desirable that the straight line L be set to have an angle θ (for example, 45°), avoiding horizontal and vertical directions at which comparatively many lines of the image data are found. However, since the pattern detection is made using the concentric circle R and by detecting whether the dot images are on the concentric circle, it is not necessary to pay much attention to the angle θ of the straight line L and the pattern detection can be made at various angles.

Figure 7:
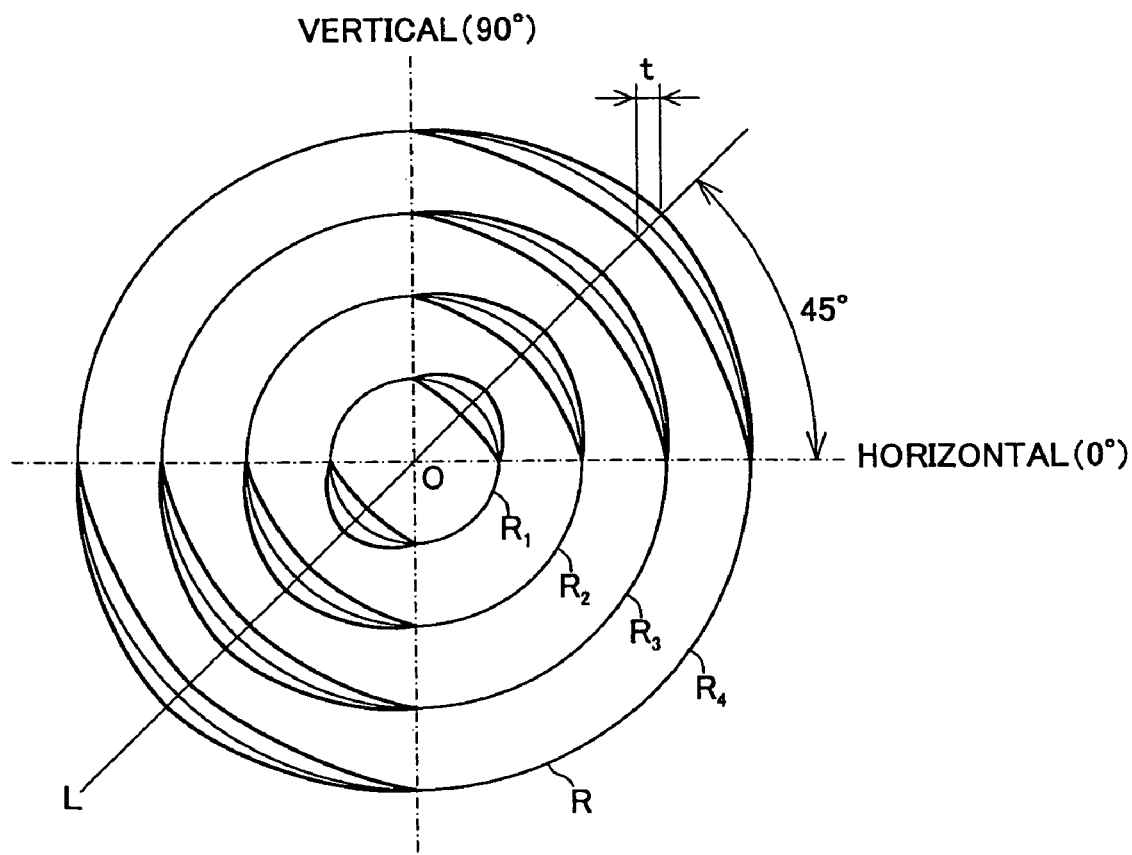
FIG. 7 is an explanatory diagram of an example of detecting the dot images on concentric circles according to the present invention.

FIG. 7 is a diagram of an example of detecting the dot images on the concentric circle R. In detecting whether the dot images are on the concentric circles $R_1$ to $R_n$, detection is made with some tolerance in detecting the position in the direction of radius. The detection thickness t of the concentric circles on which the dot images sit can be made to differ depending on the angle of the straight line L on which the plurality of dot images are aligned. For example, when the dot images are positioned in the direction with angle θ of recommended angle of 45°, detection is made with a comparatively large thickness t and the dot images in the horizontal (0°) and vertical (90°) directions are severely detected substantially with the thickness t of 0.

This is based on the supposition that image patterns of the document contain comparatively many horizontal and vertical image elements, for which severe judgment is required but that image patterns of the document contain comparatively few image elements in the direction of the angle θ. This leads to speedy judgment of dot images aligned with the angle θ and higher speed of detection. While pattern detection can be made by detecting the coordinates of dot images, arithmetic processing takes time and the detection speed becomes slower.

Figure 8A:
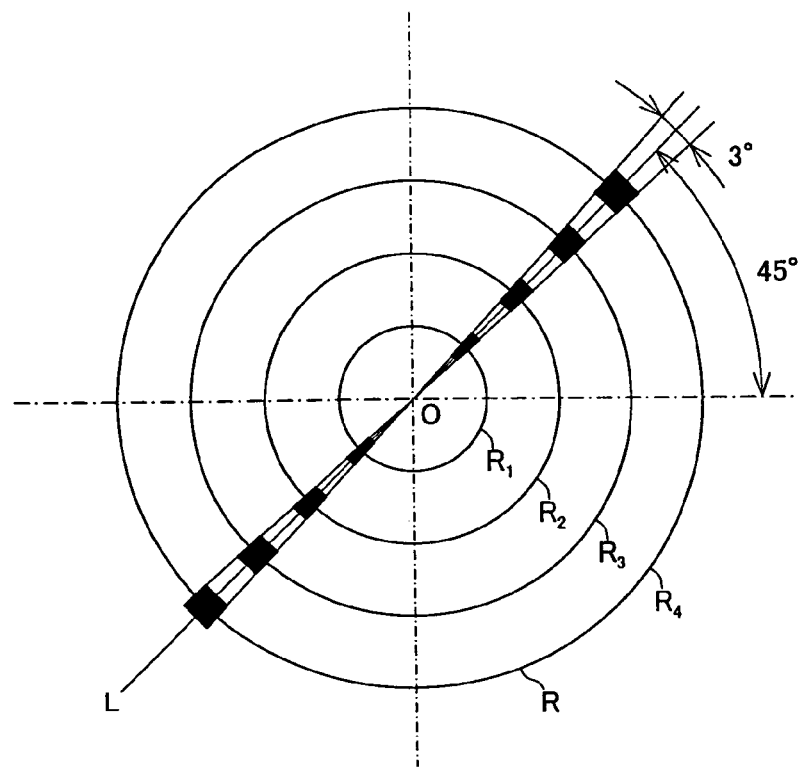
FIG. 8A and FIG. 8B are explanatory diagrams of an example of detecting the linearity of a plurality of dot images on the concentric circles according to the present invention.
Figure 8B:
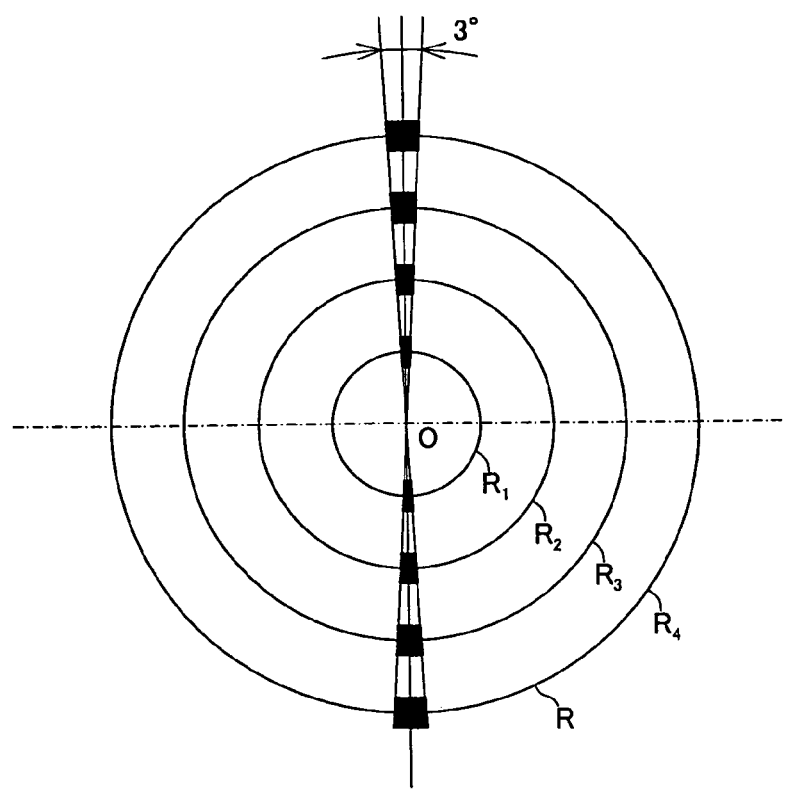

FIG. 8A and FIG. 8B are diagrams of an example of detecting the linearity of a plurality of dot images on the concentric circle R from the position in circumferential direction. Even when dot images are on the concentric circles, dot images can deviate from the straight line L running through the center O of the concentric circle, and in this case, these dot images are deleted as noises. When dot images are added to the document as the specific image information or such image is read out by a scanner, the document is not necessarily accurately positioned and for example, if an A4 size document is inclined by 1°, deviation of 5.1 mm in the long side and 3.7 mm in the short side is caused.

If the angle of the straight line L is caused to swing to some extent by the condition of placing the document, etc., as seen above, the detection rate decreases in terms of detection of linearity of dot images. For this reason, it is desirable that by providing some tolerance in the detection of the linearity, the rate of detecting dot images be increased. With respect to the linearity, experience shows that by detecting within the angle range of 3° (±1.5°), detection can be made without erroneous recognition. With respect to the detection of linearity, the range of detection angle is uniformly extended, without distinction among horizontal direction, vertical direction and angle θ.

Figure 9:
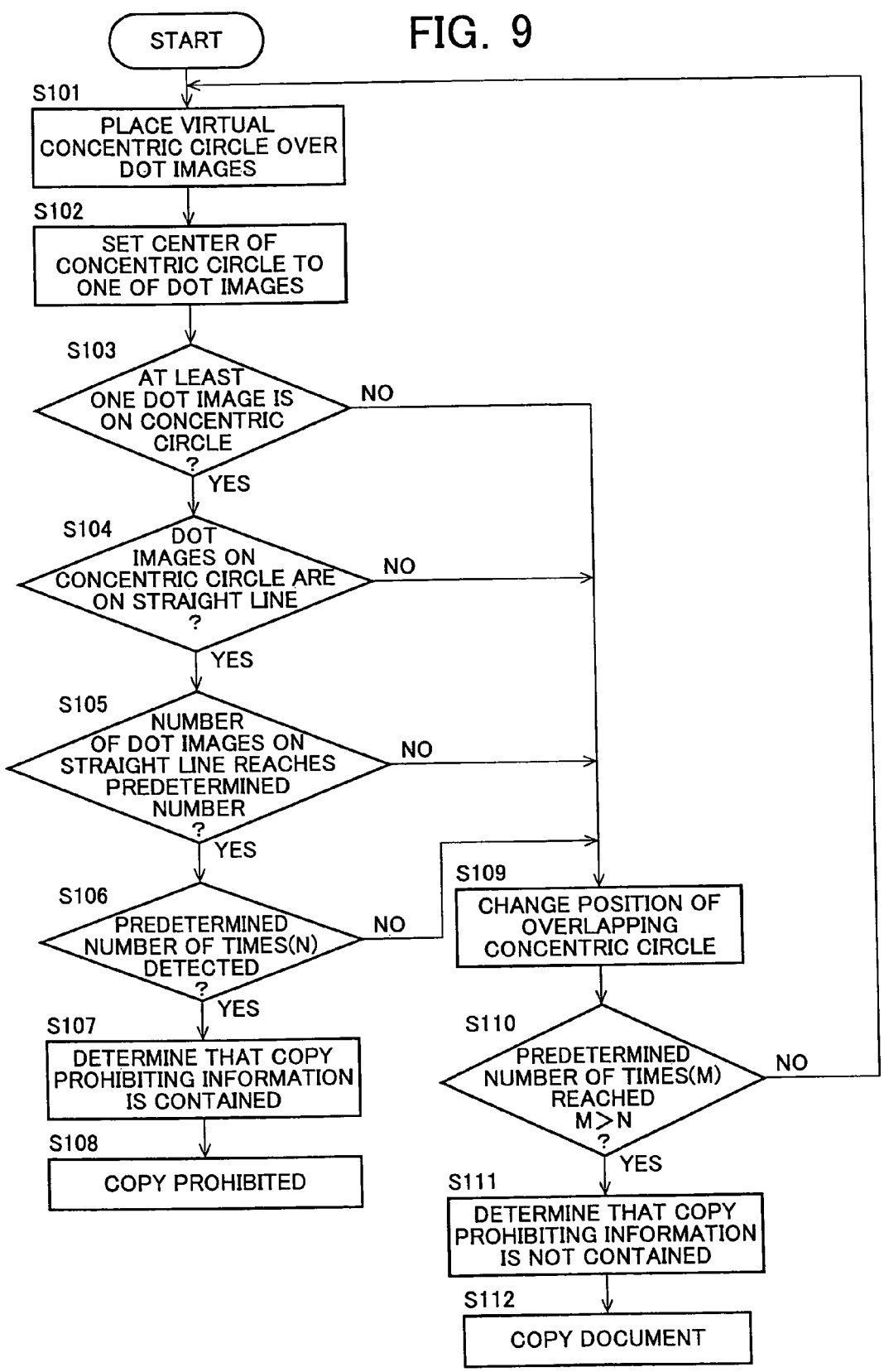
FIG. 9 is a diagram of a flow of the pattern image detecting method according to the present invention.

FIG. 9 is a diagram of a flow of the pattern image detecting method according to the present invention described above. At step S101, in such mode as described in FIG. 6A or FIG. 6B, virtual concentric circles are placed over the dot images detected by the image processing. Next, at step S102, the center of the concentric circles is set on one of the dot images. At step S103, detection is made of whether at least one dot image is present on each circle of the concentric circles. If the dot image is present on each circle of the concentric circles (YES), then at the next step S104, detection is made of whether the dot images on respective concentric circles are aligned in a straight line.

If the dot images are aligned in a straight line (YES), then at step S105, detection is made of whether the number of the dot images aligned on a straight line has reached a predetermined number. If the number of the dot images has reached the predetermined number (YES), then the dot images are determined as copy prohibiting pattern, and at step S106, detection is made of whether the number of times of detection of the pattern has reached a predetermined number of times (N). If the number of times of detection of the pattern has reached the predetermined number (YES), then at step S107, it is determined that a copy prohibiting information is contained and at step S108, copying of the document is prohibited.

In each case of NO at step S103, step S104, step S105, and step S106, an instruction is given to change the position of overlapping the concentric circle and retry the pattern detection at different locations at step S109. At step S110, detection is made of whether the number of times of the redetection trial has reached a predetermined number of times M which is more than the predetermined number of times N. If the number of times has not reached the predetermined number of times M (NO), then the flow goes back to the start and overlapping position is changed and the flow is repeated. If the number of times has reached the predetermined number of times M (YES), then at step S111, it is determined that no copy prohibiting information is contained, and at step S112, the document is copied.

As described above, The present invention enables determination of the specific image information by detecting a plurality of dot images making up the specific image information positioned on a plurality of concentric circles of different diameters and by detecting these dot images lying on a straight line running through a center of the concentric circles and as a result, enables easy detection of the specific image information even if a document to be read is placed in an inclined manner and detection of the specific image information even if there is some degree of dislocation (within an error range) of position of the plurality of the dot images making up the specific image information, contributing to a higher detection rate and a higher detection speed.

The invention claimed is:

1. An image detecting method of detecting specific pattern image added to image data of a document, comprising:

reading the image data of the document by an image reading portion of a digital multi-function peripheral; and detecting a dot image arranged on a straight line running through the center of a plurality of concentric circles among other dot images on the plurality of concentric circles, wherein a pattern image composed of a plurality of the dot images is extracted from the read image data by a specific image information detecting portion, the plurality of concentric circles having radiuses and distances set in advance are placed over the pattern image, and one of the plurality of dot images is positioned at the center of the plurality of concentric circles.

2. The image detecting method as defined in claim 1, wherein in detecting whether the dot images are on the concentric circles, the range of detection in the direction of diameter of the concentric circles is extended depending on the angle at which the pattern image is arranged.

3. The image detecting method as defined in claim 2, wherein the range of detection in the direction of diameter of the concentric circles is minimized when the angle at which the pattern image is arranged is horizontal)(0°) and vertical (90°) and is maximized when the angle at which the pattern image is arranged is in the middle)(45°).

4. The image detecting method as defined in claim 1, wherein in detecting whether the dot images are on the straight line running through the center of the concentric circles, the range of detection in the circumferential direction of the concentric circles is extended to)3° (±1.5°).

5. The image detecting method as defined in any one of claims 1 to 4, wherein when the plurality of dot images arranged in the straight line are of a circular or rectangular dot shape, the center of one of the dot images is positioned at the center of the concentric circles.

6. The image detecting method as defined in any one of claims 1 to 4, wherein when the plurality of dot images arranged in the straight line are of a short linear shape, one end of one of the dot images is positioned at the center of the concentric circles.

* * * * *